United States Patent Office 2,908,592
Patented Oct. 13, 1959

2,908,592
METHOD OF PRODUCING A SELENIUM RECTIFIER

Hermann Karl Josef Strosche, Nurnberg, Germany, assignor to International Standard Electric Corporation, New York, N.Y., a corporation of Delaware No Drawing. Application January 11, 1956
Serial No. 558,423

Claims priority, application Germany February 24, 1955

1 Claim. (Cl. 117—200)

The application relates to a method of producing selenium rectifiers, and particularly to an arrangement for improving the barrier layer.

It is known that selenium rectifiers generally consist of a metallic base plate, a layer of selenium, a counter electrode applied to the layer of selenium, and a barrier layer between the selenium and the counter electrode which produces the rectifying properties of the selenium rectifier. The counter electrode usually consists of an alloy containing cadmium. As a result of a chemical reaction with the selenium there is created, soon after the application of the counter electrode, an intermediate layer of cadmium selenide. The cadmium selenide layer has a tendency to grow and during the operation of the rectifier, the layer of cadmium selenide continues to grow and may increase to an unfavourable thickness. To impede or stop this growth, it has been proposed to apply to the selenium, prior to the application of the counter electrode, a layer of cadmium selenide by means of an evaporation in a vacuum. The counter electrode, which is thus applied to this layer of selenide, will contain no cadmium, so that the layer of cadmium selenide is prevented from growing further.

By the evaporation there is obtained a cadmium selenide layer on the rectifier plate which prevents further growing of the intermediate layer but which, itself, represents a considerable additional resistance. Apart therefrom, such rectifiers are highly subjected to ageing, when the counter electrode contains the customary additions of thallium or similar substances.

This invention relates to a method of producing selenium rectifiers, characterized in that the selenium is coated with a layer of hexagonal cadmium selenide.

In the usual way of evaporating cadmium selenide there is obtained on the selenium a cadmium-selenide layer of cubical crystalline structure.

In accordance with the invention a layer of cadmium selenide is applied to the selenium so that there results a different modification of the cadmium selenide, which crystallizes hexagonally.

By utilizing hexagonally crystallizing cadmium selenide as an intermediate layer in selenium rectifiers, substantially lower resistance in the forward direction is obtained with concomitant excellent ageing properties. Further, the inventive layer of cadmium selenide substantially prevents the diffusion of substances contained in the counter electrode which cause a deterioration of the rectifying properties.

In accordance with the invention the hexagonal layer of cadmium selenide is produced by simultaneously evaporating the cadmium and selenium in a vacuum, from separate vaporizers, and precipitating the cadmium and selenium on a layer of selenium which is heated to a temperature of 130 to 140° C. In accordance with a method of manufacture, the base plates coated with selenium, are passed through the two vaporizers until a sufficiently thick layer of cadmium selenide is precipitated on the selenium. The temperature of the two vaporizers is determined by the substances to be evaporated therein so that the substances evaporate simultaneously. By means of a suitable arrangement, e.g. by heating wires arranged on the back of the base plate, the base plates can be held at a constant temperature of 130–140° C. during the evaporation process. Only in this manner may hexagonal cadmium selenide be formed on the base plate.

Further, it may be desired to treat the selenium surface, prior to the application of the counter electrode, with a suitable material or materials in either liquid, gaseous or solid form, in order to increase the blocking ability of the rectifier. Such treatments e.g. consist in the application of thallium salt solutions, or in the evaporation of suitably known solid substances. In accordance with an aspect of this invention such treatments of the selenium surface are carried out prior to the application of the hexagonal layer of cadmium selenide.

The application of the novel cadmium selenide may be carried out either prior to, or subsequent to the conversion of the selenium into the condition of highest conductivity. It is preferred however, that the layer of cadmium selenide be applied to the selenium prior to the conversion of the selenium.

It is also known that certain materials such as thallium, may be added to the counter electrode to improve the properties of the rectifier, in particular the blocking voltage and the electric forming process. The thallium additives, however, have the disadvantage that during operation of the rectifier, thallium diffuses from the counter electrode into the selenium layer, thereby deteriorating the rectifier properties. The ageing, which is caused thereby, can be eliminated by utilizing a layer of hexagonal cadmium selenide. However, since it is desirable in the forming of the rectifier that the selenium contain a certain amount of the thallium it is an object of this invention to provide a method of producing selenium rectifiers so that shortly before the application of the hexagonal layer of cadmium selenide, or in conjunction with the application of the first portions of hexagonal cadmium selenide, a slight amount of thallium is applied to the surface of the selenium. This is preferably performed in the same vacuum, in which the layer of cadmium selenide was precipitated.

The evaporation of pure thallium is often difficult because thallium is coated with a strong layer of oxide. Thus the evaporation of thallium is preferably effected by evaporating an alloy consisting of thallium and cadmium. A eutectic cadmium-thallium alloy, composed of 83 percent by weight of thallium, and 17 percent by weight of cadmium, with a melting point of 203.5° C. has proved to be most suitable and best adapted to this purpose. Such an alloy is not coated with an oxide layer and can, therefore, be more easily evaporated.

As has been described hereinbefore, the evaporation of the hexagonal layer of cadmium selenide is performed so that small portions of the constituents, in separate vaporizers, are preferably simultaneously evaporated. In such case the eutectic cadmium alloy is evaporated as described above. In this way the thallium can be very exactly dosed and produces the desired forming properties of the rectifier. Ageing of the rectifier, caused by a re-diffusion of thallium during operation, is practically impossible with rectifiers produced in accordance with the invention.

Although the invention has been described in connection with specific examples, it is to be realized that other variations and examples may be developed without departing from the spirit and scope of the invention. For example, the base plate may be provided on both sides with a layer of selenium, and both such layers of selenium may be coated with a layer of hexagonal cadmium selenide. The treatment of the selenium surface prior to the application of the cadmium-selenide layer may alternatively include alkali salts, in particular caesium salts, or other suitable elements or compounds.

What is claimed is:

A method of producing selenium rectifiers comprising applying to the selenium, prior to the application of a counter electrode, a layer of hexagonally crystallizing cadmium selenide by simultaneously evaporating cadmium and selenium in a vacuum on said selenium layer while the base plate of the rectifier is maintained at a temperature of from 130° C. to 140° C.

References Cited in the file of this patent

UNITED STATES PATENTS

| | | |
|---|---|---|
| 2,279,746 | Thompson et al. | Apr. 14, 1942 |
| 2,356,094 | Saslaw | Aug. 15, 1944 |
| 2,361,157 | Thompson et al. | Oct. 24, 1944 |
| 2,370,493 | Saslaw | Feb. 27, 1945 |
| 2,479,301 | Blackburn et al. | Aug. 16, 1949 |
| 2,554,237 | Blackburn | May 22, 1951 |

FOREIGN PATENTS

| | | |
|---|---|---|
| 938,208 | France | Mar. 30, 1948 |
| 926,987 | Germany | Apr. 28, 1955 |

OTHER REFERENCES

Lange, N. A.: "Handbook of Chemistry," fifth edition, March 1944, page 170.